No. 874,623.
PATENTED DEC. 24, 1907.
R. B. POLK.
APPARATUS FOR GRADING FRUITS AND VEGETABLES.
APPLICATION FILED APR. 29, 1907.
2 SHEETS—SHEET 2.
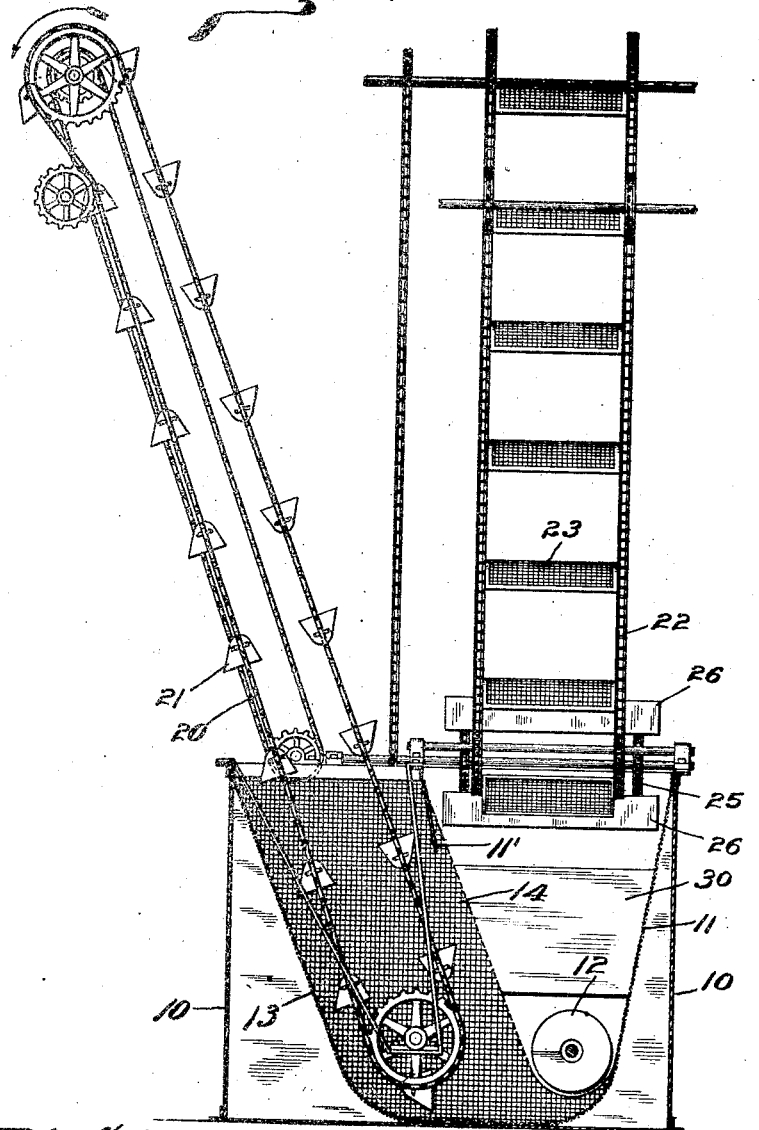
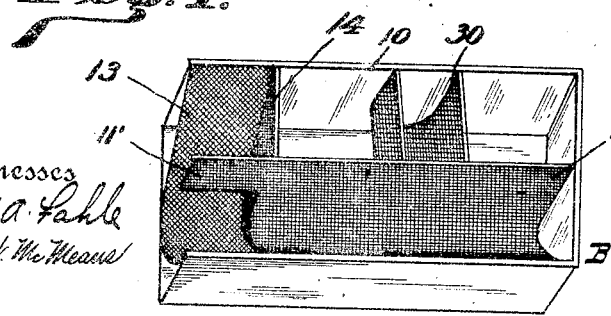
Witnesses
Frank A. Fahle
Thomas W. McMeans
Inventor
Ralph B. Polk
By Bradford Hood
Attorneys United States Patent Office.

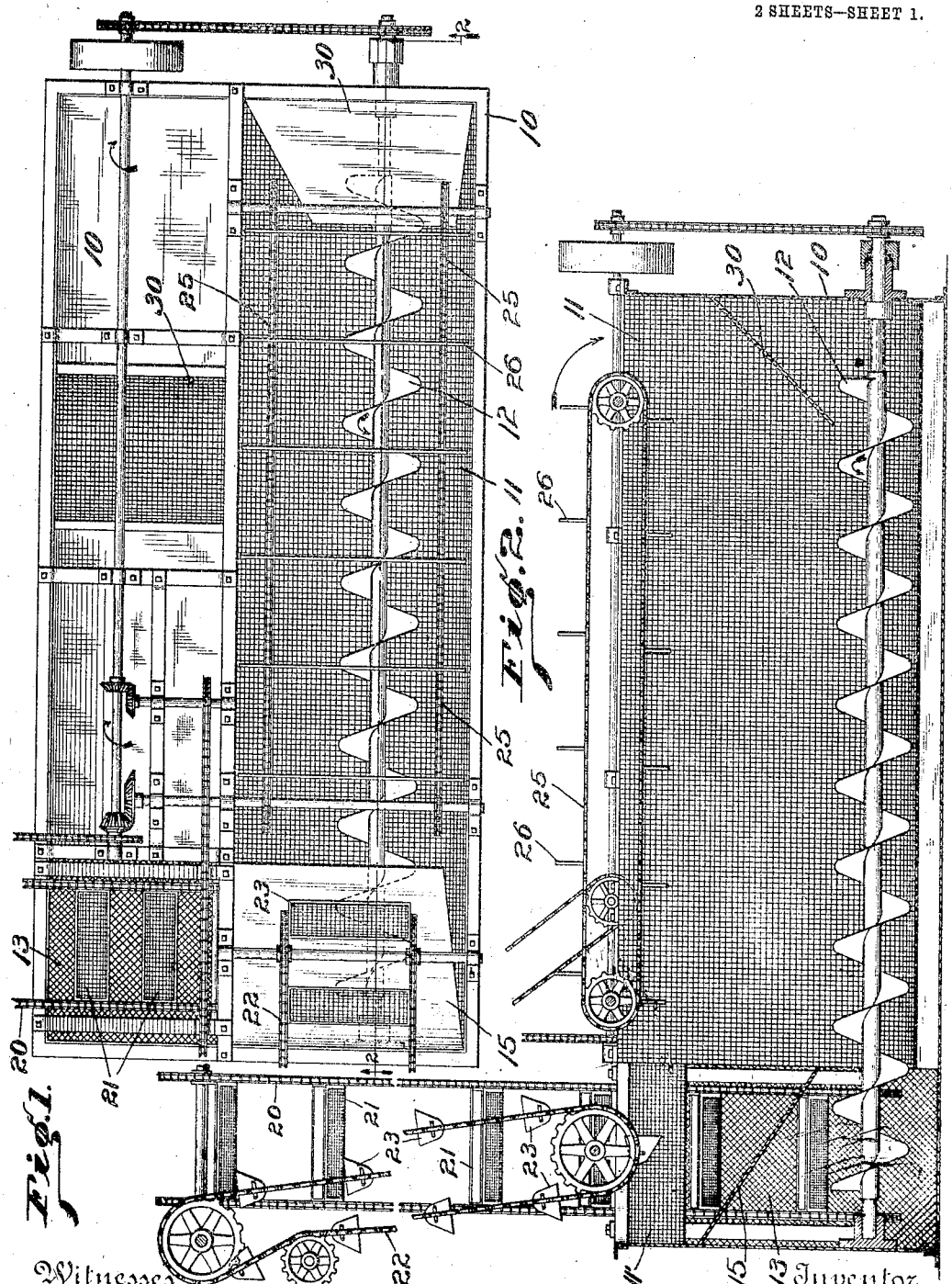

RALPH B. POLK, OF GREENWOOD, INDIANA.

APPARATUS FOR GRADING FRUITS AND VEGETABLES.

No. 874,623.

Specification of Letters Patent.

Patented Dec. 24, 1907.

Application filed April 29, 1907. Serial No. 370,810.

*To all whom it may concern:*

Be it known that I, RALPH B. POLK, a citizen of the United States, residing at Greenwood, in the county of Johnson and State of Indiana, have invented certain new and useful Improvements in Apparatus for Grading Fruits and Vegetables, of which the following is a specification.

The object of my invention is to produce an apparatus for grading fruit, especially peas, into different grades differing in specific gravity.

The accompanying drawings illustrate my invention:

Figure 1 is a plan; Fig. 2 a vertical section on line 2—2 of Fig. 1; Fig. 3 an end elevation in partial vertical section, and Fig. 4 a perspective detail of the tank (with one end removed) and screens.

In the drawings, 10 indicates a suitable watertight tank of considerable length, having arranged therein a main V-shaped trough 11 of a reticulated or perforated material said trough being open at one end and having mounted in its bottom a suitable conveyer 12, preferably of a screw type. Arranged at the discharge end of trough 11 is a larger trough or chamber 13 separated from the main body of the tank by a reticulated or perforated wall 14. The trough 11 is provided at its discharge end with a reticulated or perforated extension 11' which extends downwardly into the tank only a short distance to form a partial separation between troughs 11 and 13. Arranged at the discharge end of trough 11 is an upwardly inclined partition 15 the lower edge of which lies a short distance above the conveyer 12 while the upper end lies close to the lower edge of the extension 11'. Mounted in trough 13 is an endless elevator 20 provided with suitable perforated buckets 21, said elevator extending down into trough 13 to a point close to its bottom. An endless elevator 22, provided with perforated buckets 23 is arranged to dip into the tank at the open end of trough 11 above the bottom of the extension 11'. Mounted at the top of trough 11 is a conveyer 25 provided at intervals with cross-paddles 26 which, on the lower side of the belt, are adapted to dip into trough 11. At the receiving end of the structure I provide a downwardly and forwardly inclined baffle 30 to separate the fruit and deflect it forward as it sinks in the tank.

In operation, tank 10 is filled with a liquid of desired specific gravity, for instance a brine, the specific gravity of said liquid being such that peas of the desired grade will float therein while peas of a poorer grade will sink. The conveyers are then caused to move in the directions indicated by the arrows, and a body of peas of all grades dropped into the tank at the receiving end thereof. The conveyer 12 serves to continually stir the mass and drive the heavier peas from trough 11 into trough 13 while the lighter peas gradually separate from the heavier ones and rise in the liquid and are driven forward by the pedals on conveyer 25. The length of conveyer 12 should be considerable and the conveyer should be driven at a comparatively slow speed so that ample time will be provided for a complete separation of the peas. The heaviest peas are carried directly from trough 11 into trough 13 where they are engaged by the buckets of elevator 20 and delivered to any desired point. The intermediate grades strike the baffle 15 and those which are sufficiently light are deflected upwardly enough to come into the path of movement of the buckets 23 with the lighter peas which are fed forward by the paddles 26, the projection 11' preventing these lighter peas from passing into trough 13. All the peas which are not light enough, however, to rise above the lower edge of guard 11' will pass beneath said extension into the path of movement of the buckets 21. By this means a complete and accurate separation of the fruit is attained by a continuous operation which does not injure the fruit in any manner.

The main tank 10 is made of considerably greater capacity than the troughs 11 and 13 so that there may be a very considerable volume of brine constantly available, the volume being sufficient to prevent the production of very rapid currents due to the movement of the various conveyers in the brine. For convenience, I also support, in the tank 10, to one side of the trough 11, a reticulated salt box 30 which is sufficiently deep to extend down into the body of brine. The fresh supply of salt may be dumped into this box and serve as a feeder to maintain the brine at a desired density, the amount of salt required varying with the quantity and condition of peas which are operated on.

I claim as my invention:

1. In a vegetable grader, the combination, with a tank, of a conveyer mounted in the bottom of said tank and adapted to feed the vegetables from one end of the tank to the other, a second conveyer arranged in the upper portion of the tank, and a pair of elevators arranged at the delivery end of the tank and adapted to remove the vegetables therefrom at different levels, and means for preventing the deep level elevator from engaging the high level vegetables.

2. In a vegetable grader, the combination, with a tank of considerable volume, having a passage-way formed therein and of comparatively small volume, said passage-way having free communication with the main body of the tank but confining vegetables thereto, of a conveyer arranged at a low level in said passage-way, a second conveyer arranged at a higher level in said passage-way, a pair of elevators, one projecting into said tank at a lower level than the other in position to receive vegetables from the low level conveyer, and a guard for preventing vegetables at the higher level from passing to the low level conveyer.

3. In a vegetable grader, the combination, with a tank of considerable volume, having a passage-way formed therein and of comparatively small volume, said passage-way having free communication with the main body of the tank but confining vegetables thereto, of a conveyer arranged at a low level in said passage-way, a second conveyer arranged at a higher level in said passage-way, and a pair of elevators, one projecting into said tank at a lower level than the other in position to receive vegetables from the low level conveyer.

4. In a vegetable grader, the combination, with a tank of considerable length, of a conveyer mounted in the bottom of said tank and adapted to feed the vegetables from one end of the tank to the other, means for driving said conveyer, a second conveyer arranged in the upper portion of the tank, and a pair of discharging means adapted to remove the vegetables from the tank at different levels.

5. In a vegetable grader, the combination, with a brine tank of considerable volume, having a passage-way formed therein and of comparatively small volume, said passage-way having free communication with the main body of the tank but capable of retaining the vegetables, of a conveyer arranged at a low level in passage-way, a second conveyer arranged at a higher level in said passage-way, means for driving said conveyers in the same direction, and a pair of elevators, one projecting into said tank at a lower level than the other in position to receive vegetables from the low level conveyer while the other of said elevators receives vegetables from the high level conveyer.

In witness whereof I have hereunto set my hand and seal at Indianapolis, Indiana, this twenty-seventh day of April, A. D. one thousand nine hundred and seven

RALPH B. POLK. [L. S.]

Witnesses:
 ARTHUR M. HOOD,
 THOMAS W. MCMEANS.